United States Patent
Iyer et al.

(10) Patent No.: US 11,755,338 B2
(45) Date of Patent: Sep. 12, 2023

(54) SYSTEMS AND METHODS FOR OPERATING DATA PROCESSING UNITS

(71) Applicant: Dell Products L.P., Round Rock, TX (US)

(72) Inventors: Shyam Iyer, Cedar Park, TX (US); Srinivas G. Gowda, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 241 days.

(21) Appl. No.: 17/385,717

(22) Filed: Jul. 26, 2021

(65) Prior Publication Data

US 2023/0028430 A1    Jan. 26, 2023

(51) Int. Cl.
  *G06F 9/44*    (2018.01)
  *G06F 9/445*    (2018.01)
  *G06F 12/109*    (2016.01)
  *G06F 9/4401*    (2018.01)

(52) U.S. Cl.
  CPC ........ *G06F 9/44505* (2013.01); *G06F 9/4403* (2013.01); *G06F 12/109* (2013.01); *G06F 2212/657* (2013.01)

(58) Field of Classification Search
  CPC ................. G06F 1/32; G06F 9/44; G06F 1/12
  See application file for complete search history.

(56) References Cited

U.S. PATENT DOCUMENTS 10,102,232 B2 * 10/2018 Ylönen ............... G06F 11/3055
  2020/0394144 A1 * 12/2020 Osada .................. G06F 9/4406

OTHER PUBLICATIONS

Nvidia Bluefield-3 DPU, Programmable Data Center Infrastructure On-a-Chip, Nvidia Corporation, dated Apr. 12, 2021 (2 pages).

* cited by examiner

*Primary Examiner* — Keshab R Pandey
(74) *Attorney, Agent, or Firm* — Chamberlain, Hrdlicka, White, Williams & Aughtry

(57) ABSTRACT

A node that includes data processing unit (DPU) and a processor, where the processor is configured to perform a method for utilizing a data processing unit (DPU), that includes identifying, by the DPU, a processing entity operatively connected to the DPU, receiving processing entity properties from the processing entity, storing the processing entity properties in a processing entity catalog, generating a virtual combined memory space in the processing entity catalog, and providing access to the processing entity catalog to a BIOS.

20 Claims, 9 Drawing Sheets

SYSTEMS AND METHODS FOR OPERATING DATA PROCESSING UNITS

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

SUMMARY

In general, in one aspect, embodiments relate to a method for utilizing a data processing unit (DPU), that includes identifying, by the DPU, a processing entity operatively connected to the DPU, receiving processing entity properties from the processing entity, storing the processing entity properties in a processing entity catalog, generating a virtual combined memory space in the processing entity catalog, and providing access to the processing entity catalog to a BIOS.

In general, in one aspect, embodiments relate to a non-transitory computer readable medium that includes instructions which, when executed by a computer processor, enables the computer processor to perform a method for utilizing a data processing unit (DPU), that includes identifying, by the DPU, a processing entity operatively connected to the DPU, receiving processing entity properties from the processing entity, storing the processing entity properties in a processing entity catalog, generating a virtual combined memory space in the processing entity catalog, and providing access to the processing entity catalog to a BIOS.

In general, in one aspect, embodiments relate to a node, that includes data processing unit (DPU), and a processor, where the processor is configured to perform a method for utilizing a data processing unit (DPU), that includes identifying, by the DPU, a processing entity operatively connected to the DPU, receiving processing entity properties from the processing entity, storing the processing entity properties in a processing entity catalog, generating a virtual combined memory space in the processing entity catalog, and providing access to the processing entity catalog to a BIOS.

Other aspects of the invention will be apparent from the following description and the appended claims.

DETAILED DESCRIPTION

Figure 1:
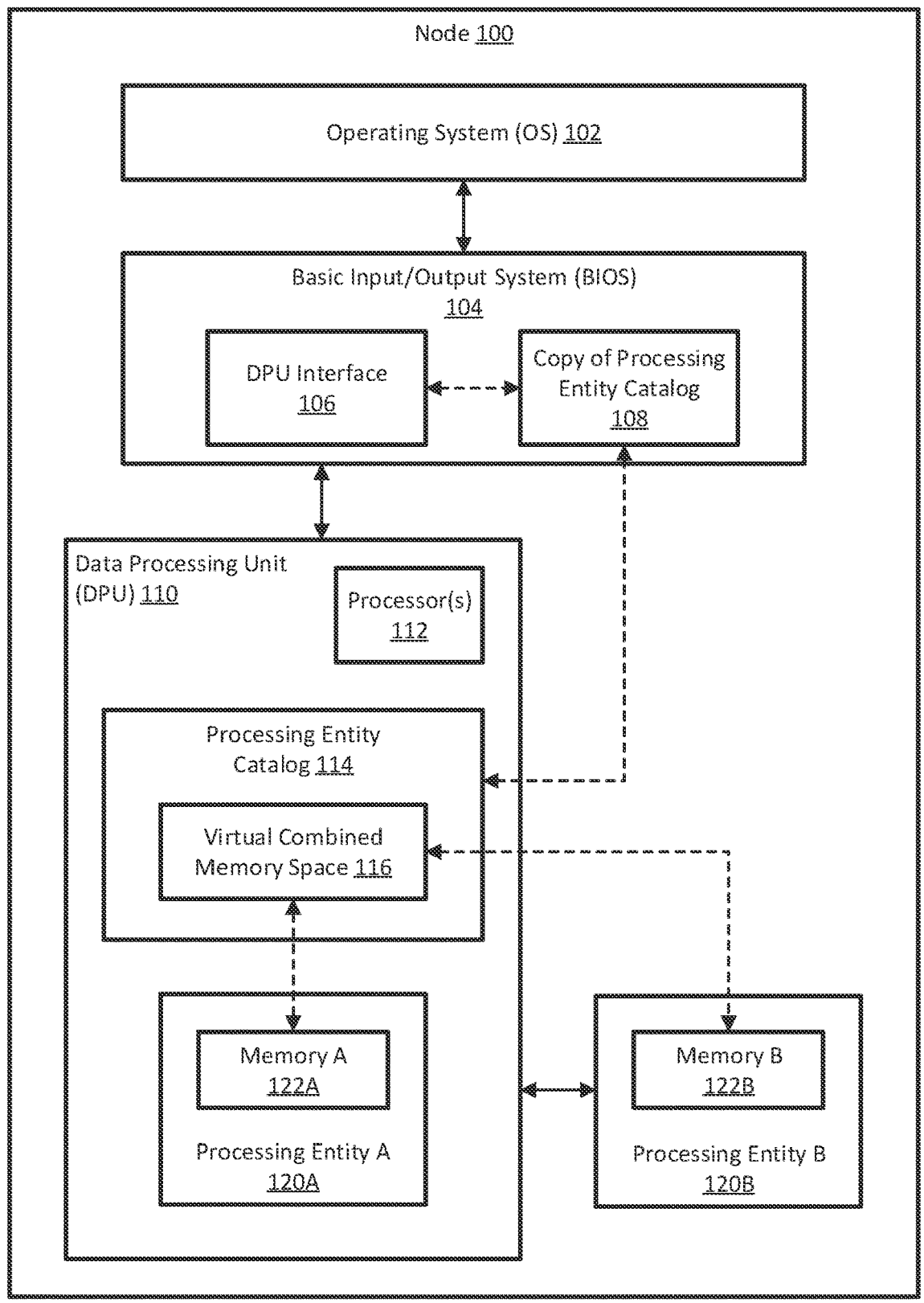
FIG. 1 shows a diagram of node, in accordance with one or more embodiments of the invention.

In general, embodiments of the invention relate to systems and methods for identifying, managing, and utilizing components of a data processing unit (DPU) and one or more processing entities operatively connected to that DPU. In one or more embodiments, the DPU acts as an intermediary between a host machine and the individual processing entities. And, as a DPU may independently communicate with one or more processing entities (having its own processor and executing its own operating system), the DPU may provide various functionalities to a host machine to interact with the processing entities.

As described herein, a DPU may generate and provide certain data structures to a BIOS (of a host) that may be modified and returned by the BIOS to affect modifications to one or more processing entities. In turn, the BIOS may generate one or more interface(s) (e.g., an application programming interface (API), a general user interface (GUI)), utilize drivers, and modify the provided data structure to indirectly interact with the processing entities. Further, the DPU may be configured to aggregate the available memory of each processing entity and form a virtual combined memory space that may be utilized by the BIOS and/or host software.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details, known to those of ordinary skill in the art, may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired connection or wireless connection directly between two devices) or indirect (e.g., wired and/or wireless connections between any number of devices connecting the operatively connected devices) connection.

FIG. 1 shows a diagram of a node, in accordance with one or more embodiments of the invention. The node (100) may include an operating system (OS) (e.g., OS (102)), a basic input/output system (BIOS) (e.g., BIOS (104)), a data processing unit (DPU) (e.g., DPU (110)), and/or one or more processing entities (e.g., processing entity B (120B)). Each of these components is described below.

In one or more embodiments of the invention, OS (e.g., OS (102)) is software executing on the node (100). In one embodiment of the invention, an OS (102) coordinates operations between software executing in user space (not shown) and the BIOS (104) to facilitate the proper use of the components of that hardware (e.g., DPU (110), processing entity B (120B)). In one or more embodiments of the invention, the OS (102) allows for the creation of user space (not shown) that generally provides a virtual space in which user-initiated software executes (not shown). In one embodiment of the invention, OS (102) does not have direct access to underlying hardware components (e.g., DPU (110) and/or processing entity B (120B)). Instead, OS software must provide commands and/or requests to the BIOS (104), which coordinates the exchange of information between hardware components (e.g., DPU (110), processing entity B (120B)) and the OS (102).

In one or more embodiments of the invention, a BIOS (e.g., BIOS (104)) is firmware executing on the node (100) used to initialize hardware components (e.g., DPU (110)) prior to the OS (102) initializing. In one or more embodiments of the invention, the BIOS may be a unified extensible firmware interface (UEFI) or similar firmware for initializing hardware. The BIOS (104) may coordinate operations between software executing in OS (102) and one or more hardware components (e.g., DPU (110)) to facilitate the proper use of that hardware. Specifically, the BIOS (104) may be executing a DPU interface (106) and/or storing a copy of processing entity catalog (108). Each of these components is described below.

In one or more embodiments of the invention, a DPU interface (e.g., DPU interface (106)) is software executing in the BIOS (104) that is used to interact (i.e., exchange information) with the DPU (110). In one or more embodiments, a DPU interface (106) may take the form of an application programming interface (API), a general user interface (GUI), and/or an advanced configuration and power interface (ACPI). In one or more embodiments of the invention, the DPU interface (106) is capable of receiving commands (e.g., from an OS (102) via an API, from a user via a GUI/ACPI, etc.) and modifying the copy of processing entity catalog (108) corresponding to the received command.

In one or more embodiments of the invention, the DPU interface (106) allows the OS (102) (or other components of the node) to query what processing entities (120A, 120B) are connected to the DPU (110), the processing entity properties, configurable settings, and the available memory (via the virtual combined memory space (116)).

In one or more embodiments of the invention, the DPU interface (106) may be an API (without a graphical component) that allows for querying for available information and sending commands to configure modifiable settings. In one or more embodiments of the invention, the DPU interface may have a graphical component (e.g., a GUI or ACPI to be displayed on a computer monitor connected to the node) that includes a display of all of the information of the processing entity properties. A graphical component may exist with or without an API.

In one or more embodiments of the invention, a copy of processing entity catalog (108) is a data structure storing information related to one or more processing entities (e.g., 120A, 120B). In one or more embodiments of the invention, a copy of processing entity catalog (108) is a copy of the processing entity catalog (114) of the DPU (110), but which may be modified by the BIOS (104) via the DPU interface (106). The copy of the processing entity catalog (108) may be stored on BIOS (104) memory (not shown), DPU (110) memory (not shown), or any other memory of the node. Further in one or more embodiments of the invention, the memory on which the copy of the processing entity catalog is stored may be shared memory that is accessible by both the BIOS (104) and the DPU (110). Additional details of the processing entity catalog may be found in the description of the DPU (110) and FIG. 2, below.

In one or more embodiments of the invention, a data processing unit (DPU) (e.g., DPU (110)) is a hardware device executing software that enables the DPU (110) to receive commands (e.g., from BIOS (104)) and coordinate the flow of data to one or more processing entities (e.g., 120A, 120B). A DPU (110) may include any number of processing entities within the DPU (110) embedded on the same hardware (e.g., processing entity A (120A)) and/or may be operatively connected to any number of processing entities outside of the DPU (110) hardware (e.g., processing entity B (120B)). In one or more embodiments of the invention, a DPU (110) may include one or more processor(s) (e.g., processor(s) (112)), a processing entity catalog (e.g., processing entity catalog (114)), and/or a processing entity (e.g., processing entity A (120A)). Each of these components is described below.

In one or more embodiments of the invention, a processor (e.g., processor(s) (112)) is an integrated circuit for processing instructions (e.g., those of DPU (110)). In one embodiment, a processor (112) may be one or more processor cores or processor micro-cores. A processor (112) of a DPU (110) may be executing a DPU OS and/or firmware (not shown) that includes the instructions to perform the operations of the DPU (110).

In one or more embodiments of the invention, a processing entity catalog (e.g., processing entity catalog (114)) is a data structure that includes processing entity properties (not shown) regarding each processing entity operatively connected to the DPU (110). In one or more embodiments of the invention, a processing entity catalog (114) may further include a virtual combined memory space (e.g., virtual combined memory space (116)). Additional details of the processing entity catalog (114), processing entity properties, and the virtual combined memory space may be found in the description of FIG. 2.

In one or more embodiments of the invention, a processing entity (e.g., processing entity A (120A), processing entity B (120B)) is hardware computing device. Non-limiting examples of a processing entity (e.g., 120A, 120B) include a graphical processing unit (GPU), a processor, a network interface controller (NIC), a storage device (e.g., memory), and/or any other hardware computing device. Further, as shown in FIG. 1, a processing entity (e.g., 120A, 120B) may include memory (e.g., memory A (122A), memory B (122B)). In one or more embodiments of the invention, a processing entity (120A, 120B) may include memory (122A, 122B) for its own use (e.g., internal memory of a GPU), memory (122A, 122B) meant to be accessible by devices outside of the processing entity (e.g., by the DPU, BIOS, OS), or some combination of memory that is externally accessible and only internally accessible. External processing entities (e.g., 120B) may be operatively connected to the DPU (110) via one or more common interfaces and protocols (e.g., peripheral component interconnect (PCI), PCI express (PCIe), M.2, serial advanced technology attachment (SATA), etc.). Internal processing entities (e.g., 120A) may be embedded on the same hardware as the DPU (110) (e.g., soldered to the same printed circuit board).

In one or more embodiments of the invention, memory (e.g., memory A (122A), memory B (122B)) is one or more hardware devices capable of storing digital information (e.g., data) in a non-transitory medium. In one or more embodiments, when accessing memory (122A, 122B), software (e.g., OS software, BIOS (104)) may be capable of reading and writing data at the smallest units of data normally accessible (e.g., "bytes"). Specifically, in one or more embodiments, memory (122A, 122B) may include a unique physical address for each byte stored thereon, thereby enabling software to access and manipulate data stored in memory (122A, 122B) by directing commands to a physical address of memory (122A, 122B) that is associated with a byte of data (e.g., via a virtual-to-physical address mapping). Accordingly, in one or more embodiments, software is able to perform direct, "byte-level" manipulation of data stored in memory (unlike, for example, data stored on traditional persistent storage devices, which must first be copied in "blocks" to other, intermediary storage mediums prior to reading and/or manipulating data located thereon).

Accordingly, as used herein, "memory", "memory device", "memory storage", and "memory storage device" refer to hardware storage devices that are capable of being accessed and/or manipulated at a "byte-level" regardless of whether that device is volatile, non-volatile, persistent, non-persistent, sequential access, random access, solid-state, or disk based. Non-limiting examples of memory devices include, but are not limited to, certain integrated circuit storage (e.g., flash memory, random access memory (RAM), dynamic RAM (DRAM), static RAM (SRAM), resistive RAM (ReRAM), etc.). Further, hybrid devices that include two or more forms of storage (e.g., a non-volatile dual in-line memory (NVDIMM)) may be considered "memory" if the hybrid device component that interacts with the node (100) is capable of being accessed and/or manipulated at a "byte-level". For example, a "persistent memory" (PMem) module that includes a combination of DRAM, flash memory, and a capacitor (used, in the event of power loss, to persist DRAM data to flash memory) is considered "memory" because the DRAM component (the component of the module accessible by the node (100)) is capable of being accessed and/or manipulated at a "byte-level".

While FIG. 1 shows a specific configuration of a system, other configurations may be used without departing from the scope of the invention. Accordingly, embodiments disclosed herein should not be limited to the configuration of devices and/or components shown in FIG. 1.

Figure 2:
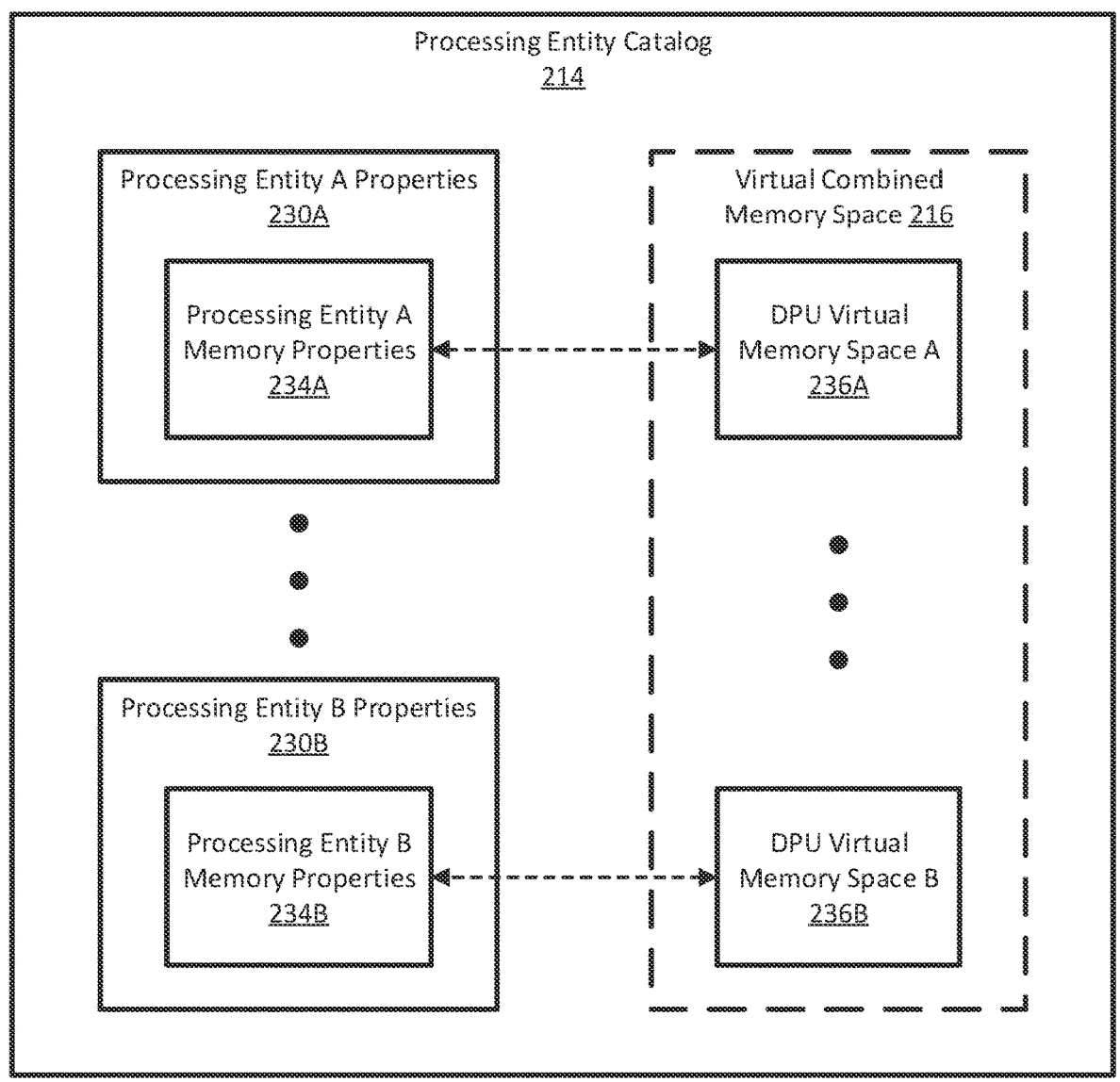
FIG. 2 shows a diagram of a processing entity catalog, in accordance with one or more embodiments of the invention.

FIG. 2 shows a diagram of a processing entity catalog, in accordance with one or more embodiments of the invention. The processing entity catalog (214) may include one or more processing entity properties (e.g., processing entity A properties (230A), processing entity B properties (230B)) and/or a virtual combined memory space (e.g., virtual combined memory space (216)). Each of these components is described below.

In one or more embodiments of the invention, processing entity properties (e.g., processing entity A properties (230A), processing entity B properties (230B)) are a collection of data describing a processing entity operatively connected to the DPU. Non-limiting examples of processing entity properties include (i) identifying information (e.g., a unique identifier, serial number, manufacturer, model, manufacture date, etc.), (ii) capability information (e.g., functionalities, modifiable properties (settings), clock speed, resolution, peripheral settings, etc.), (iii) status information (e.g., status data, voltage, errors, logs, etc.), and/or (iv) processing entity memory properties (e.g., processing entity A memory properties (234A), processing entity B memory properties (234B)), described below.

In one or more embodiments of the invention, processing entity memory properties (e.g., processing entity A memory properties (234A), processing entity B memory properties (234B)) are properties of the memory capabilities of a processing entity. In one or more embodiments of the invention, processing entity memory properties (234A, 234B) may include data that specifies the physical address(es) of the memory (e.g., a starting address, an ending address, a range of addresses, etc.) and/or size of the memory (e.g., a number of available bytes, a maximum offset from the starting address, etc.).

In one or more embodiments of the invention, a virtual combined memory space (e.g., virtual combined memory space (216)) is a data structure that includes one or more DPU virtual memory spaces (e.g., DPU virtual memory space A (236A), DPU virtual memory space B (236B)) that are uniquely associated with a range of addresses specified in processing entity memory properties (234A, 234B). The virtual combined memory space (216) may form a virtual-to-physical address database that associates a unique virtual memory address (of a DPU virtual memory space (236A, 236B)) with a unique physical memory address (as specified in processing entity memory properties (234A, 234B)).

In one or more embodiments of the invention, a virtual combined memory space (216) may be segregated into one or more subspaces that group processing entity memory together based on one or more processing entity memory properties (236A, 236B). For example, a subspace (a consecutive range of addresses) may be formed to group "non-volatile memory" subspace while "volatile memory" may be aggregated into a different subspace. Subspaces may be formed based on any property of the memory (e.g., read/write speed, available size, manufacturer, etc.).

In one or more embodiments of the invention, a virtual combined memory space (216) may be presented as a physical address space to components external to the DPU (e.g., the BIOS, OS, node, other devices operatively connected to the node, etc.). As a non-limiting example, the BIOS may treat addresses specified in the virtual combined memory space (216) as though the addresses are the physical memory addresses of hardware domain components (even though the addresses are virtual and must be translated by the DPU). Accordingly, when the BIOS issues a read command to an address specified in the virtual combined memory space (216), the DPU may include functionalities to interpret that command and translate the specified virtual address (which the BIOS treated as a physical address) into the actual physical address of the memory device storing the data. Thus, in one or more embodiments of the invention, the BIOS, OS, and/or other components external to the DPU may be "blind" to the virtual-to-physical translation performed by the DPU, as those components are presented a range of memory addresses that are treated as physical memory addresses.

In one or more embodiments of the invention, a DPU virtual memory space (e.g., DPU virtual memory space A (236A), DPU virtual memory space B (236B)) is a range of virtual memory addresses that is associated with a range of physical addresses specified in processing entity memory properties (234A, 234B). In one or more embodiments, the DPU virtual memory space (236A, 236B) may be sized to match the size of the available physical memory address range.

While FIG. 2 shows a specific configuration of a system, other configurations may be used without departing from the scope of the invention. Accordingly, embodiments disclosed herein should not be limited to the configuration of devices and/or components shown in FIG. 2.

Figure 3:
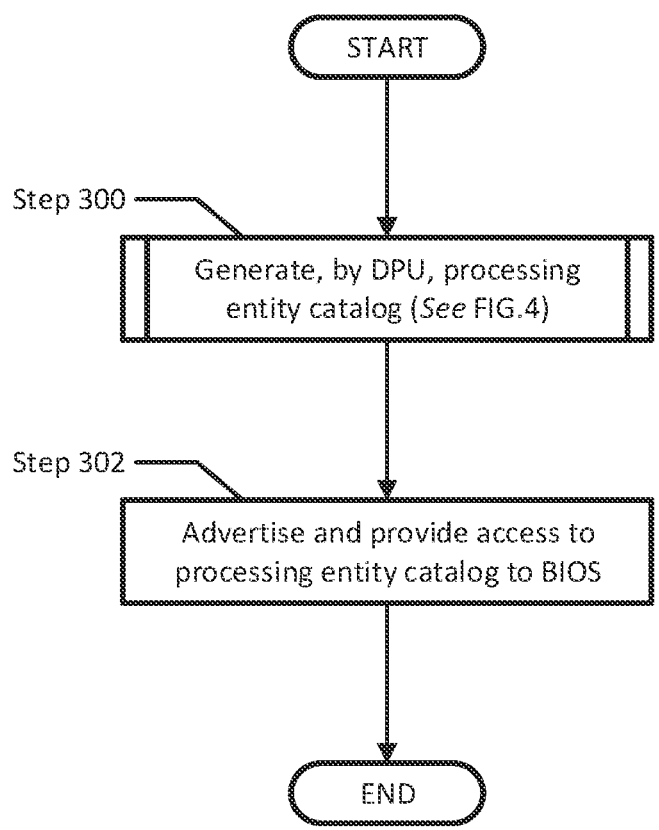
FIG. 3 shows a flowchart of a method of generating and advertising a processing entity catalog, in accordance with one or more embodiments of the invention.

FIG. 3 shows a flowchart of a method of generating and advertising a processing entity catalog, in accordance with one or more embodiments of the invention. All or a portion of the method shown in FIG. 3 may be performed by one or more components of the DPU. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 300, a DPU generates a processing entity catalog. A DPU may generate a processing entity catalog upon initial boot of the node, but prior to the boot of the BIOS or OS. Additional details regarding the process of generating a processing entity catalog may be found in the description of FIG. 4, below.

In Step 302, the DPU advertises and provides the processing entity catalog to other components of the node (e.g., the BIOS). The DPU may advertise the existence of the processing entity catalog to another component by sending data to the other component of the processing entity that informs of the catalog's existence. In turn, the DPU may wait for a request for a copy of the processing entity catalog prior to sending the copy. Alternatively, the DPU may copy the processing entity catalog to memory (accessible by both the DPU and other node components). Other node components may be configured to periodically check for the existence of the copy of the processing entity catalog in the shared memory.

Figure 4:
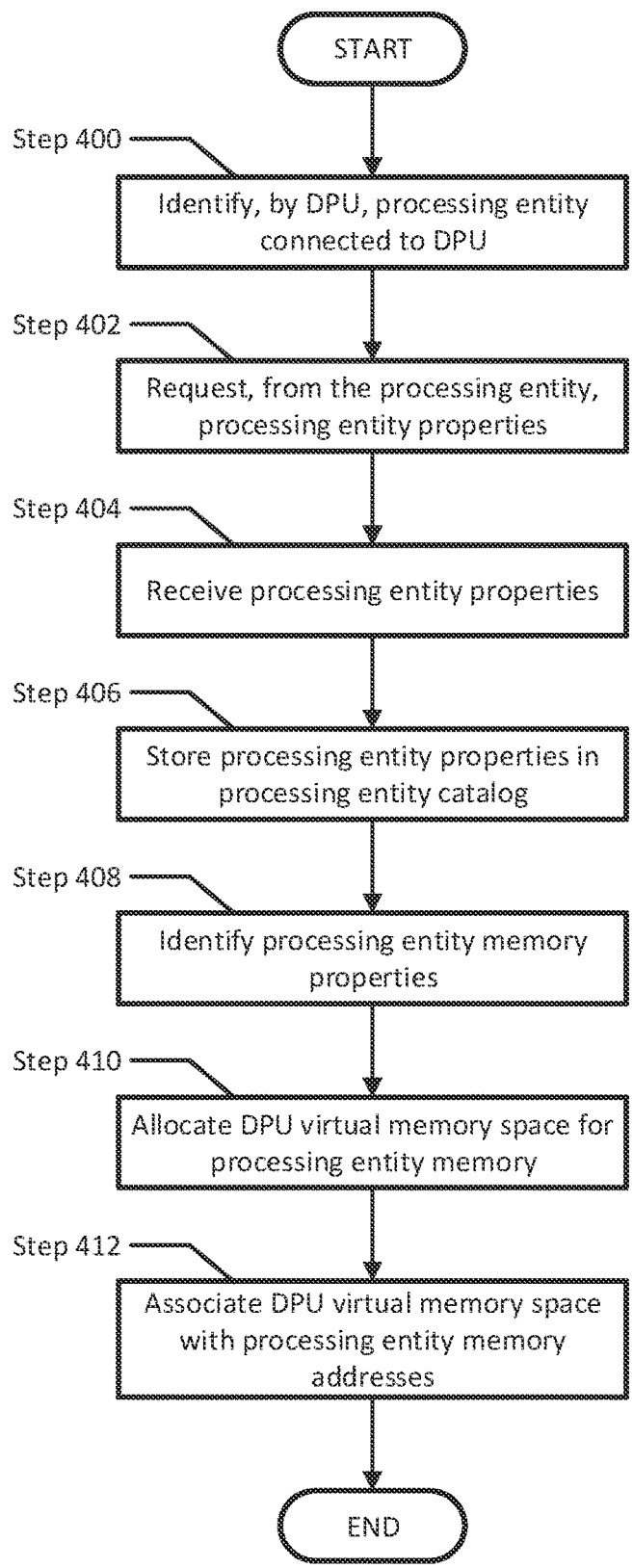
FIG. 4 shows a flowchart of a method of generating a processing entity catalog, in accordance with one or more embodiments of the invention.

FIG. 4 shows a flowchart of a method of generating a processing entity catalog, in accordance with one or more embodiments of the invention. All or a portion of the method shown in FIG. 4 may be performed by one or more components of the DPU. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 400, a DPU identifies a processing entity operatively connected to the DPU. In one or more embodiments of the invention, the DPU performs this step upon initial boot of the DPU (and node generally), when a processing entity is added to the node while the node is powered and active (i.e., "hot plugging"), when a change to the setting(s) of a processing entity are detected to be different than their previous state (e.g., via periodic comparison of the processing entity catalog and processing entity properties read from the processing entity), or when a processing entity is removed from the node. If a processing entity is removed from the node, the DPU may remove all or some data associated with the removed processing entity from the processing entity catalog and the process may end (i.e., proceed to Step 302).

In Step 402, the DPU requests processing entity properties from the processing entity. The DPU may communicate with a processing entity via any standard method of communication (e.g., as specified in a peripheral's protocol).

In Step 404, the DPU receives the processing entity properties from the processing entity. The DPU may receive the processing entity properties via the same standard method of communication used to request the processing entity properties (as described in Step 402).

In Step 406, the DPU stores the processing entity properties in the processing entity catalog. If the processing entity catalog already exists, the DPU appends the processing entity properties (acquired in Step 404) to the existing processing entity catalog. If the processing entity catalog has not yet been created, the DPU first creates the processing entity catalog and saves the processing entity properties (acquired in Step 404) in the processing entity catalog.

In Step 408, the DPU identifies the processing entity memory properties (of the broader processing entity properties) to identify the memory capabilities of the processing entity. Specifically, the DPU may identify the physical address range of the processing entity's memory component.

In Step 410, the DPU allocates a DPU virtual memory space for the processing entity memory range (identified in Step 408) in the virtual combined memory space of the processing entity catalog. In one or more embodiments of the invention, the DPU allocates a DPU virtual memory space (i.e., a block of virtual addresses) that is the same size as the range of physical addresses identified in the processing entity memory properties.

In Step 412, the DPU associates the DPU virtual memory space with the processing entity memory addresses specified in the processing entity memory properties. In one or more embodiments of the invention, the DPU may store this association in the virtual combined memory space as a virtual-to-physical memory mapping. After the completion of Step 412, the process may end and/or proceed to Step 302, as discussed in the description of FIG. 3.

Further, if a processing entity is disconnected from the DPU, the DPU may remove the processing entity properties and associated DPU virtual memory space from the processing entity catalog, before proceeding to Step 302.

Figure 5:
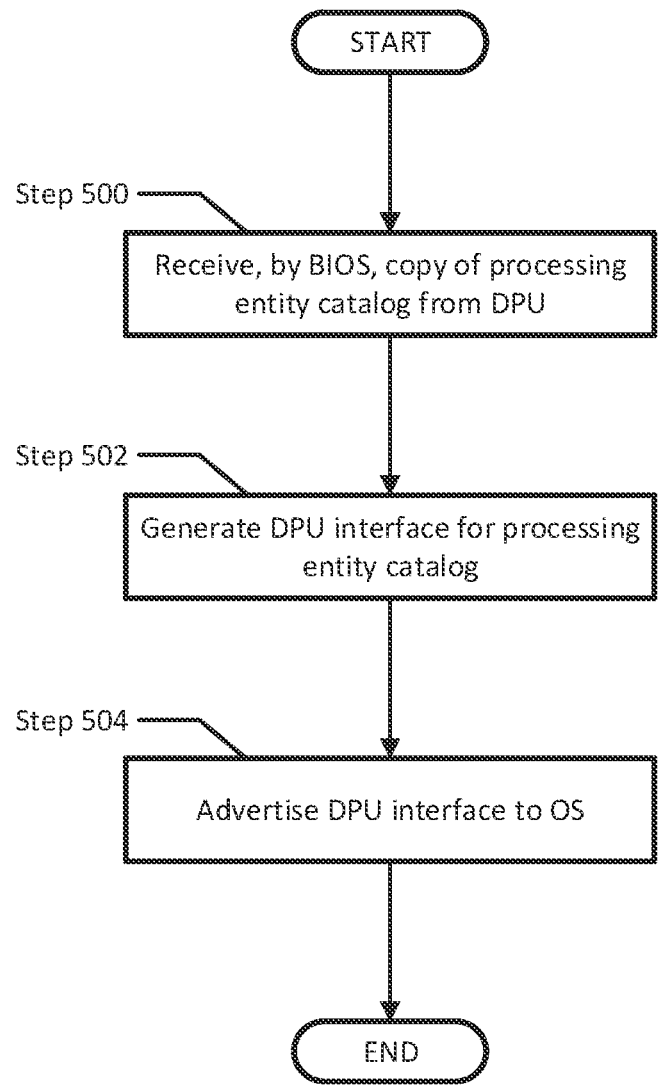
FIG. 5 shows a flowchart of a method of generating and advertising a DPU interface, in accordance with one or more embodiments of the invention.

FIG. 5 shows a flowchart of a method of generating and advertising a DPU interface, in accordance with one or more embodiments of the invention. All or a portion of the method shown in FIG. 5 may be performed by one or more components of the BIOS. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 500, a BIOS receives a copy of the processing entity catalog from the DPU. In one or more embodiments of the invention, the BIOS may copy the processing entity catalog (stored on the DPU) by accessing a known storage space (e.g., memory addresses) that are used to store the processing entity catalog. Further, the BIOS may be informed of the existence and availability of the processing entity catalog by a message received by the DPU. Alternatively, the BIOS may check the known storage space of the DPU for the existence of the processing entity catalog, and if the processing entity catalog exists, copy the processing entity catalog. In one embodiment of the invention, the DPU may communicate with the BIOS and exchange a copy of the processing entity catalog via standard peripheral protocols.

In Step 502, the BIOS generates a DPU interface for the processing entity catalog. Generating the DPU interface may include parsing the processing entity properties for each processing entity and organizing that data into a standardized format.

In Step 504, the BIOS advertises the DPU interface to other components of the node (e.g., the OS). The BIOS may advertise the existence of the DPU interface to another component by sending data (to the other component of the node) that informs of the DPU interface's existence.

Figure 6:
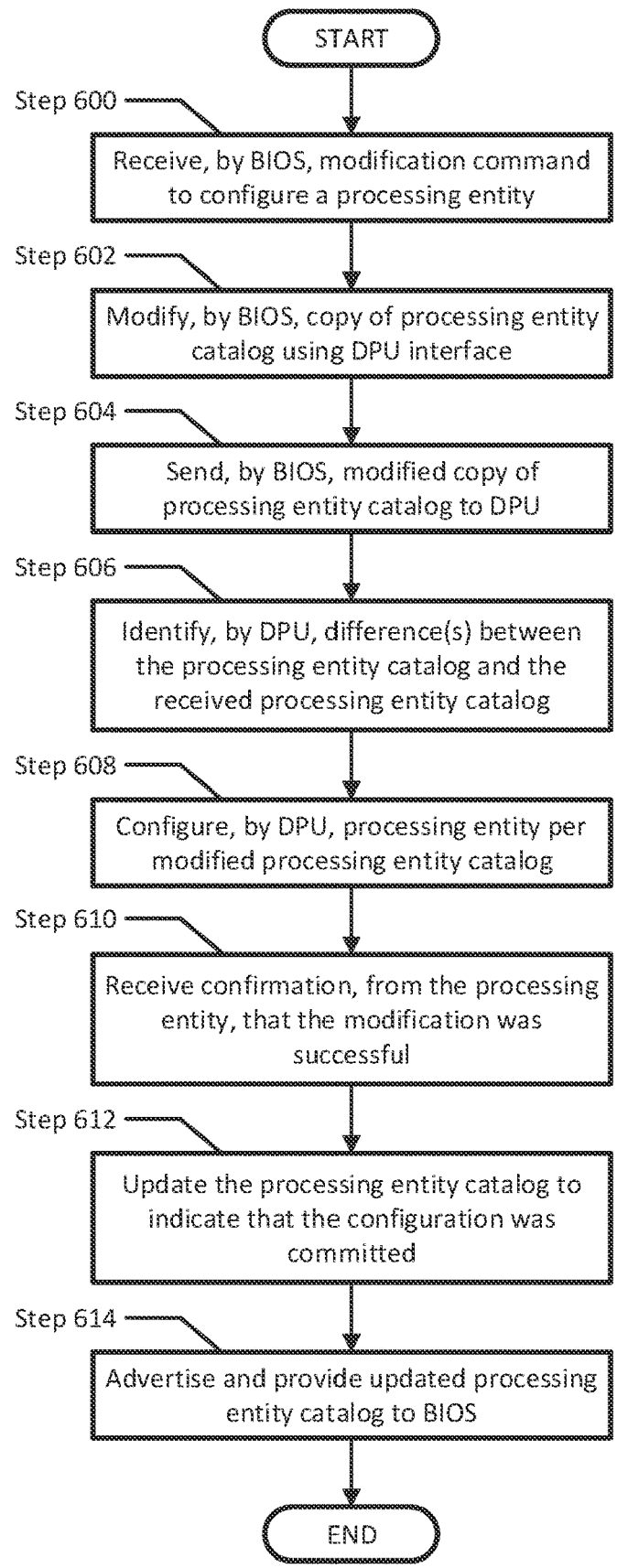
FIG. 6 shows a flowchart of a method of modifying the configuration of a processing entity, in accordance with one or more embodiments of the invention.

FIG. 6 shows a flowchart of a method of modifying the configuration of a processing entity, in accordance with one or more embodiments of the invention. In one or more embodiments of the invention, the method to configure a processing entity involves asynchronous modification of the processing entity catalog and the copy of the processing entity catalog. All or a portion of the method shown in FIG. 6 may be performed by one or more components of the node. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 600, a BIOS receives a modification command to modify one or more configurable properties (i.e., setting(s)) of a processing entity. The modification command may be received via an API (of the DPU interface) from another software instance executing in the node (e.g., the OS) or may be received via interaction with a graphical interface (of the DPU interface) as modified by a user of the node.

In Step 602, the BIOS, via the DPU interface, modifies the copy of the processing entity catalog to change the property specified in the modification command. The DPU interface may identify the data that needs to be modified in the copy of processing entity catalog via a mapping that associates API commands to underlying properties.

In one or more embodiments of the invention, if the modification command specifies a property that is not configurable, or a value that exceeds the bounds of a modifiable range, the DPU interface may return an error to the requesting entity specifying the details of the failure.

In Step 604, the BIOS sends the copy of processing entity catalog to the DPU. In one or more embodiments of the invention, the copy of the processing entity catalog may exist in memory that is shared between the BIOS and DPU; in such instances, the BIOS may inform the DPU that the copy of the processing entity catalog has been modified. Alternatively, the BIOS may modify the copy of processing entity catalog (in shared memory) and not inform the DPU of the modification.

In Step 606, the DPU receives the modified copy of the processing entity catalog and identifies the modifications made to the copy of the processing entity catalog. The DPU may identify differences (i.e., the modified properties) in the copy of the processing entity catalog by comparing the processing entity catalog (maintained by the DPU) and the copy of the processing entity catalog (received from the BIOS).

In one or more embodiments of the invention, where the copy of the processing entity catalog is stored in shared memory between the DPU and BIOS, the DPU may be informed of a modification made to the copy of the processing entity catalog by the BIOS. Alternatively, the DPU may be configured to monitor for changes in the copy of the processing entity catalog and therefore may identify modifications without notification from the BIOS.

In Step 608, the DPU configures the processing entity as specified in the copy of the processing entity catalog. The DPU may communicate with the processing entity to modify the settings via standard protocols.

In Step 610, the DPU receives confirmation of the successful modification from the processing entity. In one or more embodiments of the invention, the modification to the processing entity may fail and return a message indicating that the modification was not successful. Further, this step may include informing the BIOS that the modification was successful (or unsuccessful).

In Step 612, upon successful configuration, the DPU updates the processing entity catalog to include the new processing entity properties and indicate that the configuration was successful. This step may include performing some or all the steps discussed in the description of FIG. 4 (Steps 400-412).

In Step 614, the DPU advertises the updated processing entity catalog to the BIOS. The process of this step is substantially similar to the process described in Step 302.

In one or more embodiments of the invention, the BIOS (or other node component) may be able to change one or more settings of a processing entity without using with the processing entity catalog (e.g., skipping Steps 600-610). For example, there may exist user space software (e.g., a configuration tool) associated with a processing entity that allows for configuration of the processing entity without using the method described in Steps 600-610. In such an instance, the DPU may not be aware of the change to the processing entity when the modification is committed (i.e., the processing entity catalog does not include the new settings). In one or more embodiments of the invention, the DPU may periodically read the processing entity properties from a processing entity to update the processing entity catalog (i.e., Step 612). Further, the DPU may be configured to identify if there are changes in the processing entity properties (read from the processing entity) compared to the existing processing entity properties stored in the processing entity catalog. If differences are found, the DPU may update and advertise the updated the processing entity catalog (Steps 612-614).

Figure 7:
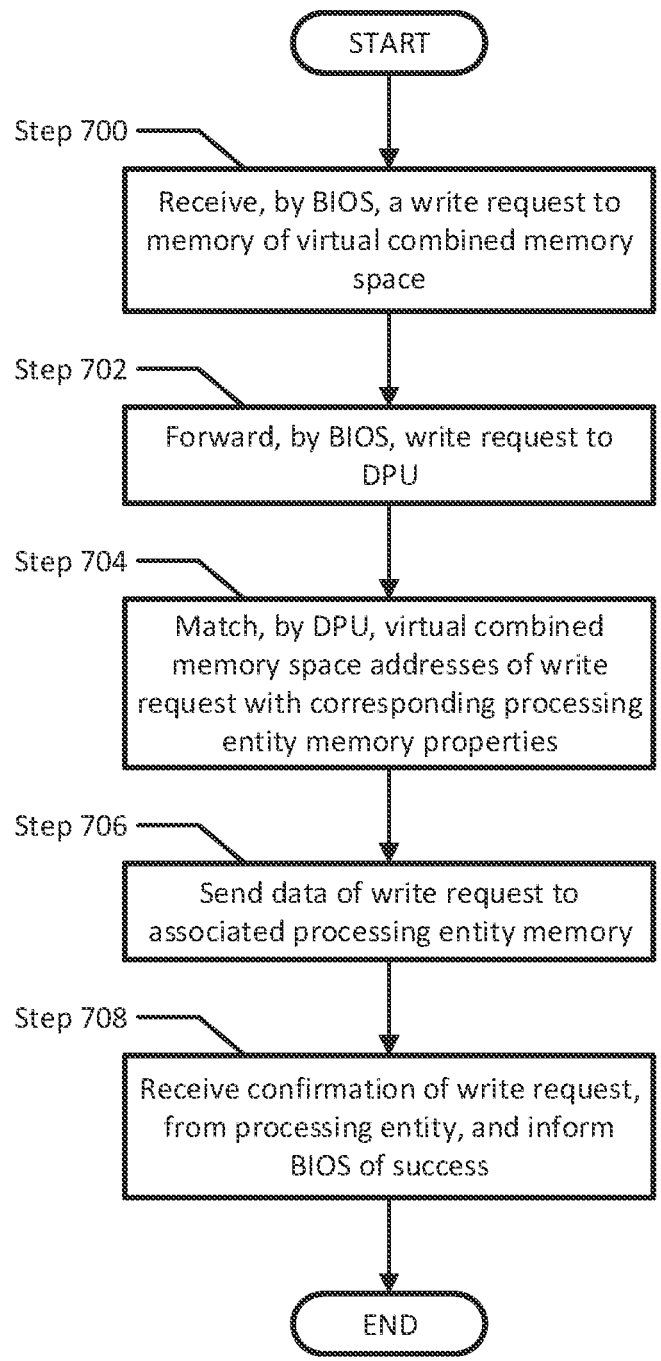
FIG. 7 shows a flowchart of a method of modifying memory, in accordance with one or more embodiments of the invention.

FIG. 7 shows a flowchart of a method of modifying memory, in accordance with one or more embodiments of the invention. All or a portion of the method shown in FIG. 7 may be performed by one or more components of the node.

However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 700, the BIOS receives a write request that includes an address of the virtual combined memory space and the data to be written at the specified address. The write request may be received from other components of the node (e.g., the OS).

In Step 702, the BIOS forwards the write request to the DPU. In one or more embodiments of the invention, the BIOS may identify that the write request does not modify any properties of the copy of the processing entity catalog (i.e., is not a modification command) and may forward the write request to the DPU for further processing.

In Step 704, the DPU matches the virtual addresses of the write request to the associated physical addresses in the virtual combined memory space. The DPU identifies the physical memory addresses by performing a lookup in the virtual combined memory space, identifying the DPU virtual memory space that includes the specified virtual addresses, then determining the matching range of physical memory addresses associated with the virtual addresses.

In Step 706, the DPU sends the data (included in the write request) to the physical addresses identified in Step 704. The physical addresses may specify one or more processing entities connected to the DPU. The DPU may communicate and send data to the processing entities via standard peripheral protocols of the processing entities.

In Step 708, the DPU receives confirmation of the successful data write from the processing entity(ies). In one or more embodiments of the invention, the write request may fail and return a message indicating that the modification was not successful. Further, this step may include informing the BIOS that the modification was successful (or unsuccessful).

Figure 8:
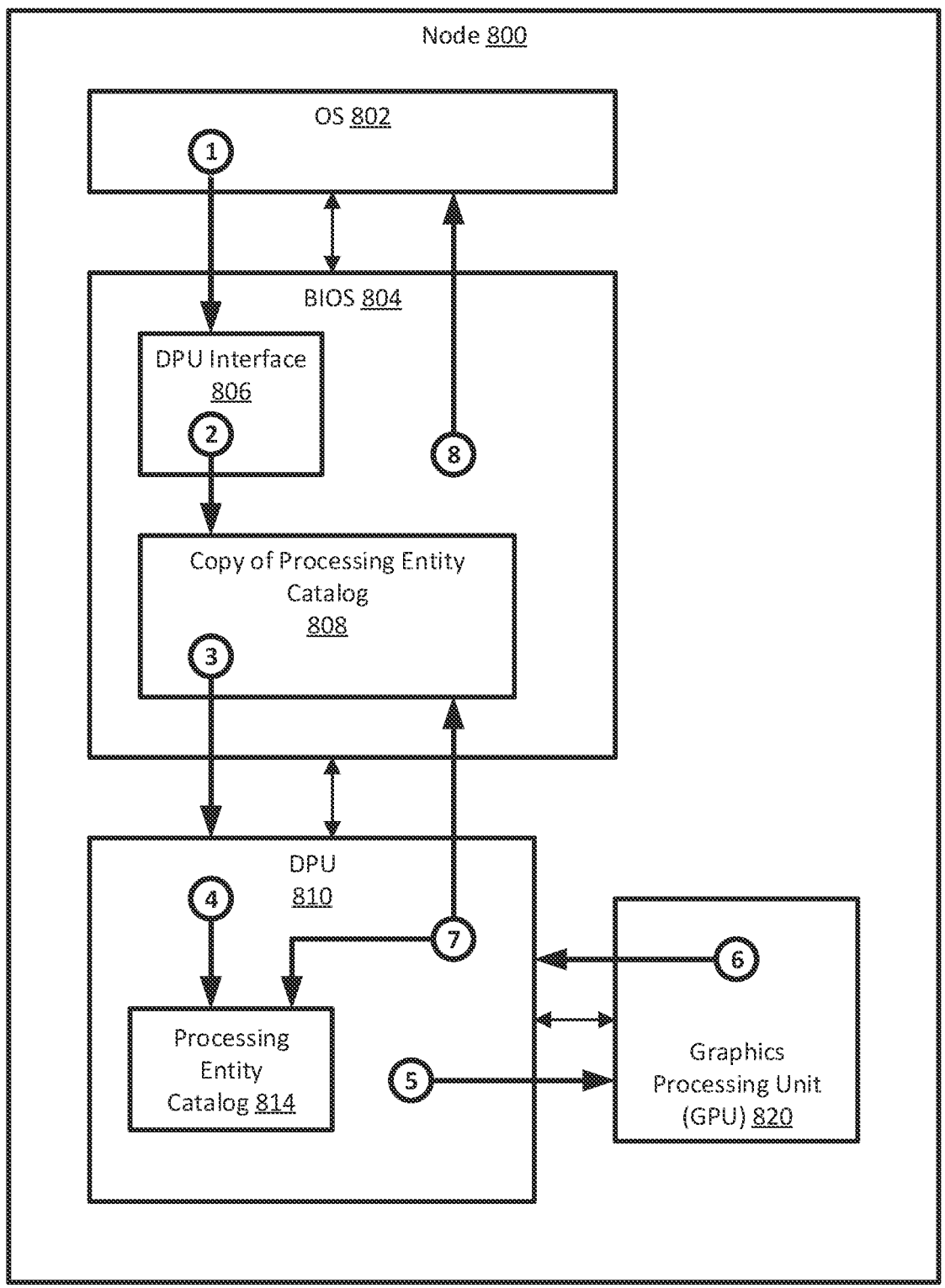
FIG. 8 shows an example of modifying the configuration of a processing entity, in accordance with one or more embodiments of the invention.

FIG. 8 shows an example of modifying the configuration of a processing entity, in accordance with one or more embodiments of the invention. The following use case is for explanatory purposes only and not intended to limit the scope to this embodiment. In FIG. 8, consider a scenario in which At (1), the OS (802) sends a modification command to the BIOS (804) of node (800). The modification command specifies changing the clock speed of GPU (820) from 1,200 MHz to 1,800 MHz. The modification command is sent to the BIOS (804) via an API command of the DPU interface (806).

At (2), the DPU interface (806) modifies the copy of the processing entity catalog (814) to change the processing entity properties associated with GPU (820) as specified in the modification command. Specifically, the DPU interface (806) modifies the clock speed setting of the GPU (820) processing entity properties by overwriting the existing value (1200) with the new value (1800).

At (3), the BIOS (804) sends the copy of processing entity catalog (808) to the DPU (810). Although not shown, the copy of the processing entity catalog (808) exists in memory that is shared between the BIOS (804) and DPU (810).

At (4), the DPU (810) identifies that modifications have been made to the copy of the processing entity catalog (808). The DPU (810) identifies the specific differences (i.e., the modified properties) in the copy of the processing entity catalog (808) by comparing the processing entity catalog (814) to the copy of the processing entity catalog (808) to determine what data is different.

At (5), the DPU (810) configures the GPU (820) as specified in the copy of the processing entity catalog (808). Specifically, the DPU (810) communicates with the GPU (820) via PCIe protocol and issues a command to change the clock speed of the GPU (820) to 1,800 MHz.

At (6), the GPU (820) performs the modification as requested by the DPU (810) and sends a message back to the DPU (810) that the change to the clock speed was successful.

At (7), the DPU (810) updates the processing entity catalog to include the updated clock speed of the GPU (820) and indicate that the configuration was successful. Further, the DPU (810) overwrites the copy of the processing entity catalog (808) with the updated processing entity catalog (814).

At (8), the BIOS (804) identifies that the copy of the processing entity catalog (808) has been updated to reflect the new GPU (820) clock speed. The BIOS (804) then informs the OS (802) that the modification command (sent at (1)) has been successfully implemented.

Figure 9:
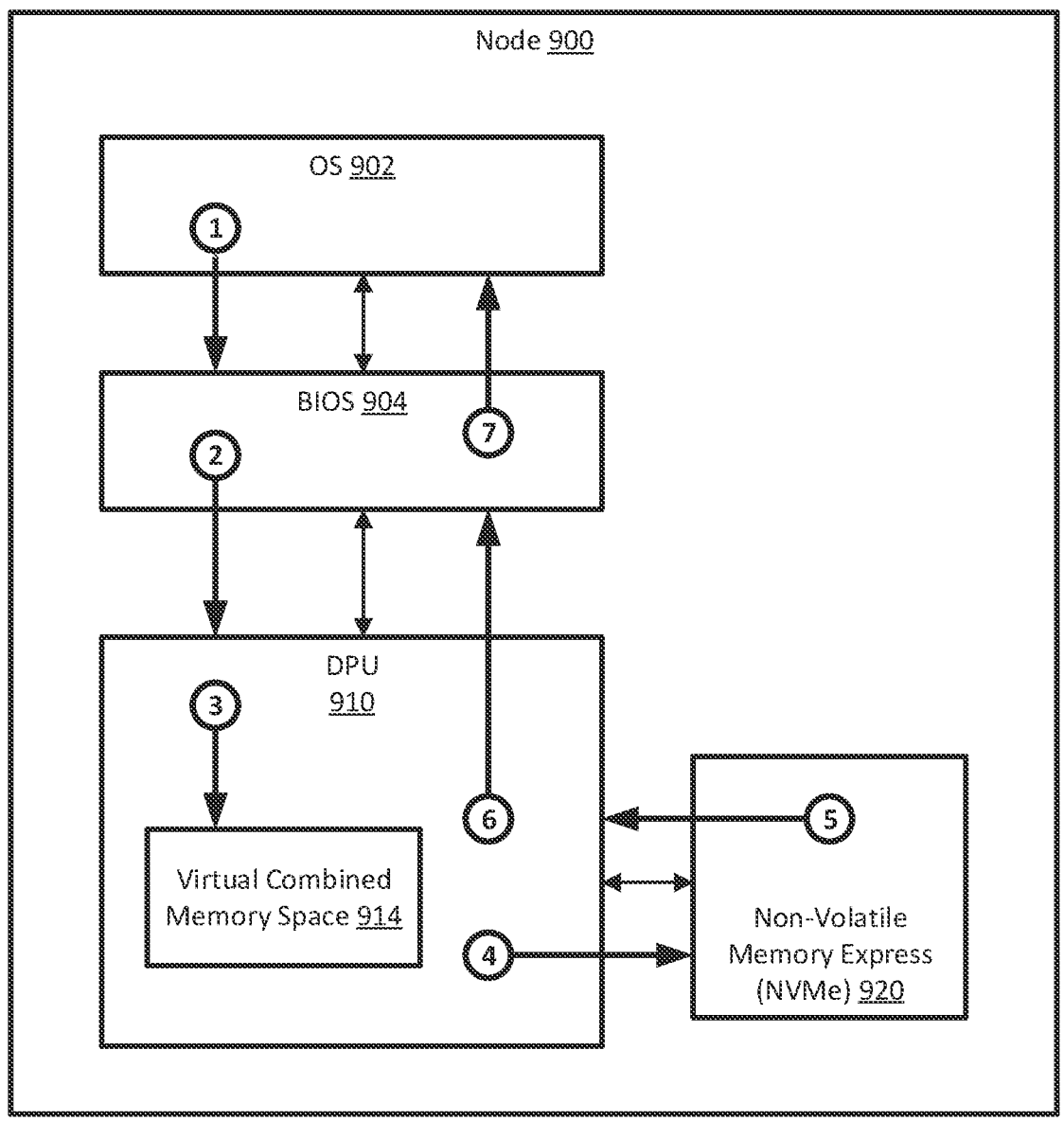
FIG. 9 shows an example of modifying memory, in accordance with one or more embodiments of the invention.

FIG. 9 shows an example of modifying memory, in accordance with one or more embodiments of the invention. The following use case is for explanatory purposes only and not intended to limit the scope to this embodiment. In FIG. 9, consider a scenario in which—

At (1), the OS (902) sends a write request to the BIOS (904) of node (900). The write request specifies virtual addresses of the virtual combined memory space (914) and includes the data to be written at the specified address.

At (2), the BIOS (904) forwards the write request to the DPU (910). The BIOS (904) identifies that the write request does not modify any properties of the copy of the processing entity catalog (not shown) and therefore forwards the write request to the DPU (910) for further processing.

At (3), the DPU (910) matches the virtual addresses of the write request to the associated physical addresses in the virtual combined memory space (914). The DPU (910) identifies the physical memory addresses by performing a lookup in the virtual combined memory space (914), identifying the DPU virtual memory space (not shown) that includes the specified virtual addresses, then determines the matching range of physical memory addresses associated with the virtual addresses.

At (4), the DPU (910) sends the write data (in the write request) to the physical addresses identified at (3). Here, the physical addresses are located on Non-Volatile Memory Express (NVMe) (920) connected to the DPU (910). The DPU (910) communicates and sends the write data to NVMe (920) via M.2 protocol.

At (5), NVMe (920) writes the provided write data to the physical addresses specified by the DPU (910). Once written, NVMe (920) sends a message back to the DPU (910) that the write action was successful.

At (6), the DPU (910) receives confirmation of the successful data write from NVMe (920). In turn, DPU (910) sends a message to the BIOS (904) that the write action was successful. And, at (7), the BIOS sends a message to the OS (902) that the write request was successfully performed.

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for utilizing a data processing unit (DPU), comprising:
   identifying, by the DPU, a processing entity operatively connected to the DPU;
   receiving processing entity properties from the processing entity;
   storing the processing entity properties in a processing entity catalog;
   generating a virtual combined memory space in the processing entity catalog, wherein generating the virtual combined memory space in the processing entity catalog comprises:
      identifying processing entity memory properties in the processing entity properties; and
      in response to identifying the processing entity memory properties:
         allocating a DPU virtual memory space for a memory of the processing entity, and
         associating the DPU virtual memory space with the memory of the processing entity; and
   providing access to the processing entity catalog to a BIOS.

2. The method of claim 1, wherein after providing access to the processing entity catalog to the BIOS, the method further comprises:
   receiving a copy of the processing entity catalog;
   comparing the processing entity catalog to the copy of the processing entity catalog;
   identifying, based on the comparing, a difference in the copy of the processing entity catalog; and
   configuring, based on the difference, the processing entity.

3. The method of claim 2, wherein configuring the processing entity comprises:
   sending a command to the processing entity, wherein the command comprises:
      instructions to modify a setting of the processing entity; and
   receiving a confirmation, from the processing entity, that the setting of the processing entity was modified.

4. The method of claim 3, wherein after receiving the confirmation, the method further comprises:
   updating the processing entity catalog to include the difference; and
   providing access to the processing entity catalog to the BIOS.

5. The method of claim 2,
   wherein providing access to the processing entity catalog to the BIOS comprises:
      creating the copy of the processing entity catalog in a shared memory, and
   wherein receiving the copy of the processing entity catalog comprises:
      identifying that the copy of the processing entity catalog has been modified.

6. The method of claim 1, wherein after providing access to the processing entity catalog to the BIOS, the method further comprises:
   receiving a write request, comprising:
      a virtual memory address; and
      data;
   matching the virtual memory address with the memory of the processing entity; and
   writing the data to the memory of the processing entity.

7. The method of claim 6, wherein matching the virtual memory address with the memory of the processing entity comprises:
   identifying, in the virtual combined memory space, the DPU virtual memory space that includes the virtual memory address; and
   identifying a physical memory address associated with the virtual memory address, wherein the physical memory address is located on the memory of the processing entity.

8. A non-transitory computer readable medium comprising instructions which, when executed by a computer processor, enables the computer processor to perform a method for utilizing a data processing unit (DPU), comprising:
   identifying, by the DPU, a processing entity operatively connected to the DPU;
   receiving processing entity properties from the processing entity;
   storing the processing entity properties in a processing entity catalog;
   generating a virtual combined memory space in the processing entity catalog; providing access to the processing entity catalog to a BIOS;
   wherein after providing access to the processing entity catalog to the BIOS:
      receiving a copy of the processing entity catalog;
      comparing the processing entity catalog to the copy of the processing entity catalog;
      identifying, based on the comparing, a difference in the copy of the processing entity catalog; and
      configuring, based on the difference, the processing entity.

9. The non-transitory computer readable medium of claim 8, wherein configuring the processing entity comprises:
   sending a command to the processing entity, wherein the command comprises: instructions to modify a setting of the processing entity; and
   receiving a confirmation, from the processing entity, that the setting of the processing entity was modified.

10. The non-transitory computer readable medium of claim 9, wherein after receiving the confirmation, the method further comprises:
    updating the processing entity catalog to include the difference; and
    providing access to the processing entity catalog to the BIOS.

11. The non-transitory computer readable medium of claim 8,
    wherein providing access to the processing entity catalog to the BIOS comprises:
       creating the copy of the processing entity catalog in a shared memory, and
    wherein receiving the copy of the processing entity catalog comprises:
       identifying that the copy of the processing entity catalog has been modified.

12. The non-transitory computer readable medium of claim 8, wherein generating the virtual combined memory space in the processing entity catalog comprises:
    identifying processing entity memory properties in the processing entity properties; and
    in response to identifying the processing entity memory properties:
       allocating a DPU virtual memory space for a memory of the processing entity; and
       associating the DPU virtual memory space with the memory of the processing entity.

13. The non-transitory computer readable medium of claim 12, wherein after providing access to the processing entity catalog to the BIOS, the method further comprises:
receiving a write request, comprising:
a virtual memory address; and
data;
matching the virtual memory address with the memory of the processing entity; and
writing the data to the memory of the processing entity.

14. The non-transitory computer readable medium of claim 13, wherein matching the virtual memory address with the memory of the processing entity comprises:
identifying, in the virtual combined memory space, the DPU virtual memory space that includes the virtual memory address; and
identifying a physical memory address associated with the virtual memory address, wherein the physical memory address is located on the memory of the processing entity.

15. A node, comprising:
data processing unit (DPU); and
a processor, wherein the processor is configured to perform a method for utilizing the DPU, comprising:
identifying, by the DPU, a processing entity operatively connected to the DPU;
receiving processing entity properties from the processing entity;
storing the processing entity properties in a processing entity catalog;
generating a virtual combined memory space in the processing entity catalog;
providing access to the processing entity catalog to a BIOS;
wherein after providing access to the processing entity catalog to the BIOS:
receiving a copy of the processing entity catalog;
comparing the processing entity catalog to the copy of the processing entity catalog;
identifying, based on the comparing, a difference in the copy of the processing entity catalog; and
configuring, based on the difference, the processing entity.

16. The node of claim 15, wherein configuring the processing entity comprises:
sending a command to the processing entity, wherein the command comprises:
instructions to modify a setting of the processing entity; and
receiving a confirmation, from the processing entity, that the setting of the processing entity was modified.

17. The node of claim 16, wherein after receiving the confirmation, the method further comprises:
updating the processing entity catalog to include the difference; and
providing access to the processing entity catalog to the BIOS.

18. The node of claim 15, wherein generating the virtual combined memory space in the processing entity catalog comprises:
identifying processing entity memory properties in the processing entity properties; and
in response to identifying the processing entity memory properties:
allocating a DPU virtual memory space for a memory of the processing entity; and
associating the DPU virtual memory space with the memory of the processing entity.

19. The node of claim 18, wherein after providing access to the processing entity catalog to the BIOS, the method further comprises:
receiving a write request, comprising:
a virtual memory address; and
data;
matching the virtual memory address with the memory of the processing entity; and
writing the data to the memory of the processing entity.

20. The node of claim 19, wherein matching the virtual memory address with the memory of the processing entity comprises:
identifying, in the virtual combined memory space, the DPU virtual memory space that includes the virtual memory address; and
identifying a physical memory address associated with the virtual memory address, wherein the physical memory address is located on the memory of the processing entity.

* * * * *